United States Patent
Phillips

(10) Patent No.: US 7,082,961 B2
(45) Date of Patent: Aug. 1, 2006

(54) FLOOD RELIEF SYSTEM

(76) Inventor: Linda Phillips, 511 San Juan Ave., Venice, CA (US) 90291

( * ) Notice: Subject to any disclaimer, the term of this patent is extended or adjusted under 35 U.S.C. 154(b) by 149 days.

(21) Appl. No.: 10/790,445

(22) Filed: Mar. 2, 2004

(65) Prior Publication Data
US 2005/0268966 A1    Dec. 8, 2005

(51) Int. Cl.
*F16K 27/08*    (2006.01)
(52) U.S. Cl. .................... 137/382; 137/357; 4/295
(58) Field of Classification Search ............. 137/357, 137/362; 4/295
See application file for complete search history.

(56) References Cited

U.S. PATENT DOCUMENTS

| | | | | |
|---|---|---|---|---|
| 2,517,195 | A | * | 8/1950 | Gaspar .................. 210/119 |
| 4,088,149 | A | * | 5/1978 | Logsdon ................. 137/433 |
| 4,180,094 | A | * | 12/1979 | Viragh .................. 137/362 |
| 5,005,603 | A | * | 4/1991 | Amundson et al. ......... 137/192 |
| 6,135,140 | A | * | 10/2000 | Grandinetti ............. 137/362 |

\* cited by examiner

*Primary Examiner*—A. Michael Chambers
(74) *Attorney, Agent, or Firm*—Joseph S. Farzam

(57) ABSTRACT

An apparatus for flood relief comprising a bell shaped hollow body having a top, a bottom, a top opening suitable for attaching a hose, and a bottom opening; a base ring having a center opening, a bottom surface, a side, an adhesive material on the bottom surface, and a protective sheet attached to the adhesive material; and a hose having the means for attaching said hose to the top opening of the body, whereby the protective sheet is removed from the adhesive material on the bottom surface of the base ring and the base ring is placed on the floor of a basement so that the center opening of the base ring is juxtaposed with a drain opening and the body is screwed on the base ring and the hose is attached to the body whereby water that rises through a basement trap will pass through the body and the hose and will be deposited onto a yard of a house. The present invention further provides for a method for flood relief comprising the steps of a means for water retention; a means for securing said means for water retention to a floor; a means for water passage, whereby the means for water retention is attached from one side to the means for securing water retentions to a floor that is secured on the floor and from the other side said means for water retention is attached to said means for water passage whereby water that rises through a basement trap will be retained through said means for water retention and will pass through said means for water passage onto a yard of a house.

2 Claims, 6 Drawing Sheets

FLOOD RELIEF SYSTEM

BACKGROUND (1) Technical Field

The present invention relates to the field of flood control and flood relief, and more particularly to a flood relief system for house basements.

(2) Discussion

Homeowners and apartment renters in many geographic areas of this country have on numerous occasions experienced the nightmare that is associated with the backflow of water and sewage through the floor drain of their basements. A flood condition in the area generally causes the backup of swage, which may rise in the pipes of a drain and fill up the floor of a basement with water and/or swage. The disastrous result of such backup usually causes an obnoxious odor and presents a serious health hazard.

Many systems have been previously proposed, most of which are expensive to manufacture and install, difficult to operate and impractical. The present invention is a system for flood relief that easily and inexpensively ameliorates the above-described situation. It has no electrical components, which renders the invention functional even at the time of a power outage. It does not require the operation of a person at the time of flooding. It is extremely simple and inexpensive to manufacture, install, and operate. Finally, it solves the problem of sewer backflow completely.

SUMMARY

The present invention is an apparatus for flood relief comprising a bell shaped hollow body having a top, a bottom, a top opening suitable for attaching a hose, and a bottom opening; a base ring having a center opening, a bottom surface, a side, an adhesive material on the bottom surface, and a protective sheet attached to the adhesive material; and a hose having the means for attaching said hose to the top opening of the body, whereby the protective sheet is removed from the adhesive material on the bottom surface of the base ring and the base ring is placed on the floor of a basement so that the center opening of the base ring is juxtaposed with a drain opening and the body is screwed on the base ring and the hose is attached to the body whereby water that rises through a basement trap will pass through the body and the hose and will be deposited onto a yard of a house. The present invention further provides for a method for flood relief comprising the steps of a means for water retention; a means for securing said means for water retention to a floor; a means for water passage, whereby the means for water retention is attached from one side to the means for securing water retentions to a floor that is secured on the floor and from the other side said means for water retention is attached to said means for water passage whereby water that rises through a basement trap will be retained through said means for water retention and will pass through said means for water passage onto a yard of a house.

In a further embodiment, the apparatus further includes a plurality of apertures on the side of the base ring whereby a plurality of water doors are secured within said apertures whereby when the water rises through the base ring, water pressure will cause the water doors to shut preventing water to run onto a basement floor and when the water level drops the water doors will open allowing water that is on the basement floor to go down the drain.

BRIEF DESCRIPTION OF THE DRAWINGS

These and other features, aspects, and advantages of the present invention will become better understood with regard to the following description, appended claims, and accompanying drawings where:

FIG. 6 is a pictorial representation of the back of an upper bridge of a Tarpin comprising indentations for securing a guitar string according to the present invention;

DETAILED DESCRIPTION

Figure 1:
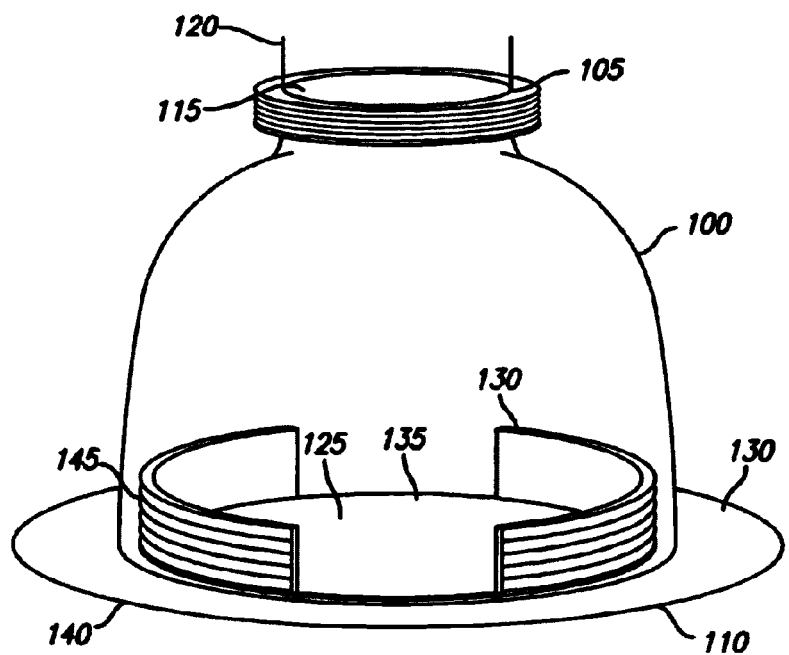
FIG. 1 is a pictorial representation of an apparatus for flood relief according to the present invention.

The present invention relates to the field of flood control and flood relief, and more particularly to a flood relief system for house basements. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of some of the terms used in the description and claims is given as a central resource for the reader. The glossary is intended to provide the reader with a "feel" for various terms as they are used in this disclosure, but is not intended to limit the scope of these terms. Rather, the scope of the terms is intended to be construed with reference to this disclosure as a whole and with respect to the claims below. Then, a brief introduction is provided in the form of a narrative description of the present invention to give a conceptual understanding prior to developing the specific details.

(1) Glossary

Before describing the specific details of the present invention, it is useful to provide a centralized location for various terms used herein and in the claims. The terms defined are as follows:

Drain Opening—Drain opening is descriptive of any opening provided on the floor of any structure or building for the purpose of water and other material to pass through and be deposited into the sewer.

Hose—Hose is intended to include any means for passing water or other liquids with or without particles from one location to the next.

Water Door—Water Door is intended to include any means for allowing or blocking the passage of water.

(2) Introduction

The present invention is an apparatus for flood relief comprising a bell shaped hollow body having a top, a bottom, a top opening suitable for attaching a hose, and a bottom opening; a base ring having a center opening, a bottom surface, a side, an adhesive material on the bottom surface, and a protective sheet attached to the adhesive material; and a hose having the means for attaching said hose to the top opening of the body, whereby the protective sheet is removed from the adhesive material on the bottom surface of the base ring and the base ring is placed on the floor of a basement so that the center opening of the base ring is juxtaposed with a drain opening and the body is screwed on the base ring and the hose is attached to the body whereby water that rises through a basement trap will pass through the body and the hose and will be deposited onto a yard of a house. The present invention further provides for a method for flood relief comprising the steps of a means for water retention; a means for securing said means for water retention to a floor; a means for water passage, whereby the means for water retention is attached from one side to the means for securing water retentions to a floor that is secured on the floor and from the other side said means for water retention is attached to said means for water passage whereby water that rises through a basement trap will be retained through said means for water retention and will pass through said means for water passage onto a yard of a house.

(3) Discussion

FIG. 1 is a pictorial representation of an apparatus for flood relief according to the present invention. The apparatus for flood relief comprises a bell shaped hollow body 100 having a top 105, a bottom 110, a top opening 115 suitable for attaching a hose 120, and a bottom opening 125. It further has a base ring 130 having a center opening 135, a bottom surface 140, a side 145 whereby the base ring 130 is placed on the floor of a basement so that the center opening 135 of the base ring 130 is juxtaposed with a drain opening and the body 100 is screwed on the base ring 130 and the hose 120 is attached to the body 100 whereby water that rises through a basement trap will pass through the body 100 and the hose 120 and will be deposited onto a yard of a house.

Figure 2:
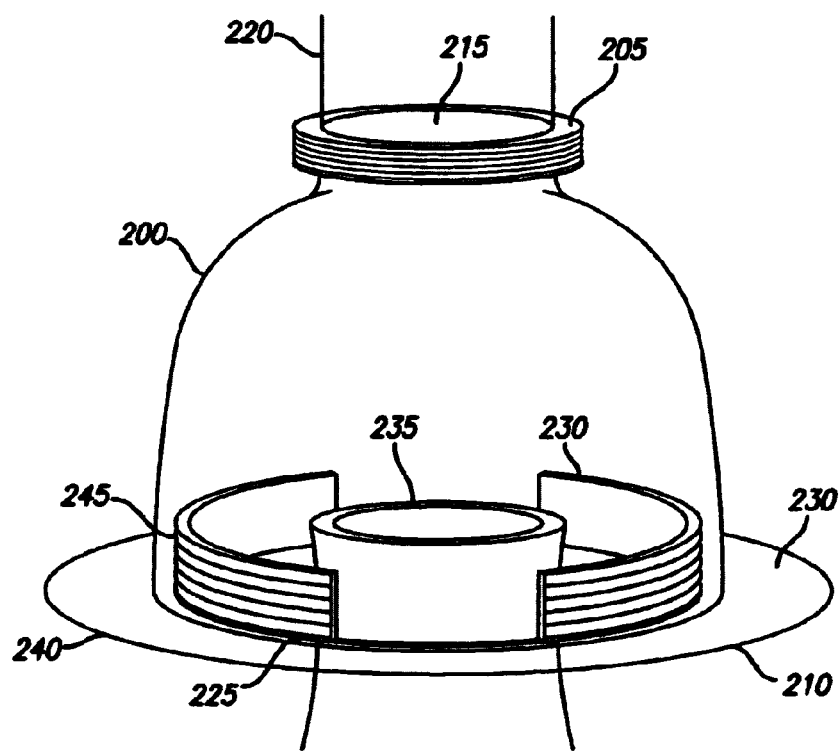
FIG. 2 is another pictorial representation of the apparatus for flood relief according to the present invention.

FIG. 2 is another pictorial representation of the apparatus for flood relief according to the present invention. The apparatus for flood relief comprises a bell shaped hollow body 200 having a top 205, a bottom 210, a top opening 215 suitable for attaching a hose 220, and a bottom opening 225. It further has a base ring 230 having a center opening 235, a bottom surface 240, a side 245 whereby the base ring 230 is placed on the floor of a basement so that the center opening 235 of the base ring 230 is juxtaposed with a drain opening 250 and the body 200 is screwed on the base ring 230 and the hose 220 is attached to the body 200 whereby water that rises through a basement trap 255 will pass through the body 200 and the hose 220 and will be deposited onto a yard of a house.

Figure 3:
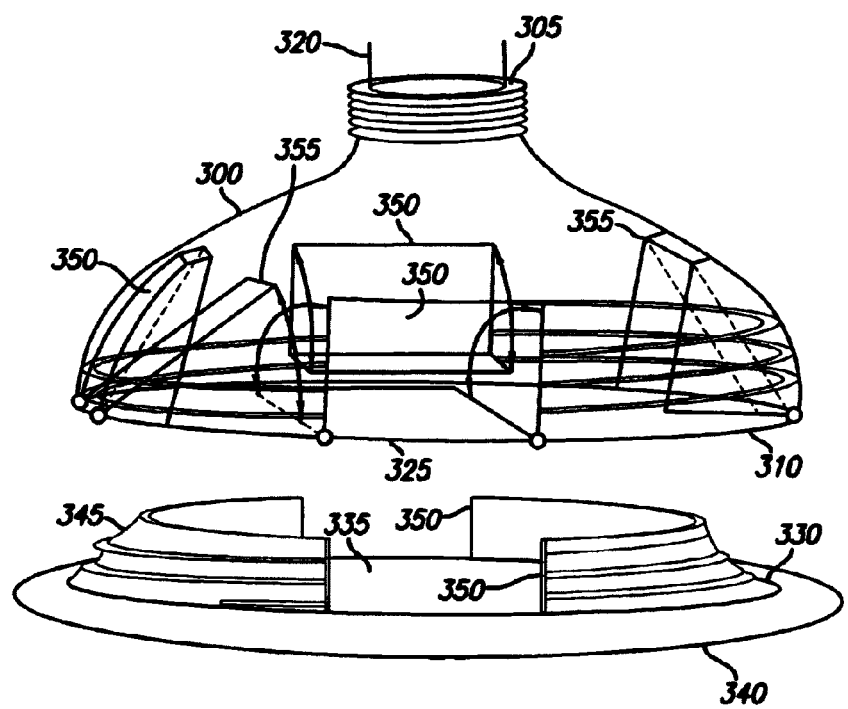
FIG. 3 is a pictorial representation of another embodiment of the apparatus for flood relief according to the present invention.

FIG. 3 is a pictorial representation of another embodiment of the apparatus for flood relief according to the present invention. In this embodiment the apparatus for flood relief comprises a bell shaped hollow body 300 having a top 305, a bottom 310, a top opening 315 suitable for attaching a hose 320, and a bottom opening 325. It further has a base ring 330 having a center opening 335, a bottom surface 340, a side 345 whereby the base ring 330 is placed on the floor of a basement so that the center opening 335 of the base ring 330 is juxtaposed with a drain opening and the body 300 is screwed on the base ring 330 and the hose 320 is attached to the body 300 whereby water that rises through a basement trap will pass through the body and the hose and will be deposited onto a yard of a house.

The body 300 and the base ring 330 of this preferred embodiment of the present invention has plurality of apertures 350 on the side 345 whereby a plurality of water doors 355 are secured within said apertures 350 whereby when the water rises through the base ring 330, water pressure will cause the water doors 355 to shut preventing water to run onto a basement floor and when the water level drops the water doors 355 will open allowing water that is on the basement floor to go down the drain.

Figure 4:
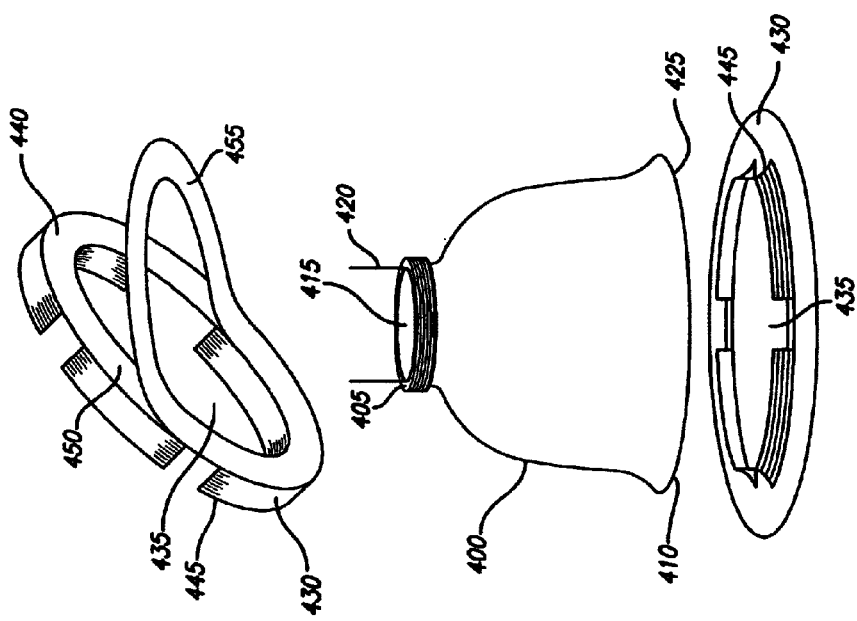
FIG. 4 is a pictorial representation of steps of setting up the apparatus for flood relief according to the present invention.

FIG. 4 is a pictorial representation of steps of setting up the apparatus for flood relief according to the present invention. In this embodiment the apparatus for flood relief comprises a bell shaped hollow body 400 having a top 405, a bottom 410, a top opening 415 suitable for attaching a hose 420, and a bottom opening 425. It further has a base ring 430 having a center opening 435, a bottom surface 440, a side 445, an adhesive material 450 on the bottom surface 440, and a protective sheet 455 attached to the adhesive material 450 whereby the protective sheet 455 is removed from the adhesive material 450 on the bottom surface 440 of the base ring 430 and the base ring 430 is placed on the floor of a basement so that the center opening 435 of the base ring 430 is juxtaposed with a drain opening and the body 400 is screwed on the base ring 430 and the hose 420 is attached to the body 400 whereby water that rises through a basement trap will pass through the body 400 and the hose 420 and will be deposited onto a yard of a house.

Figure 5:
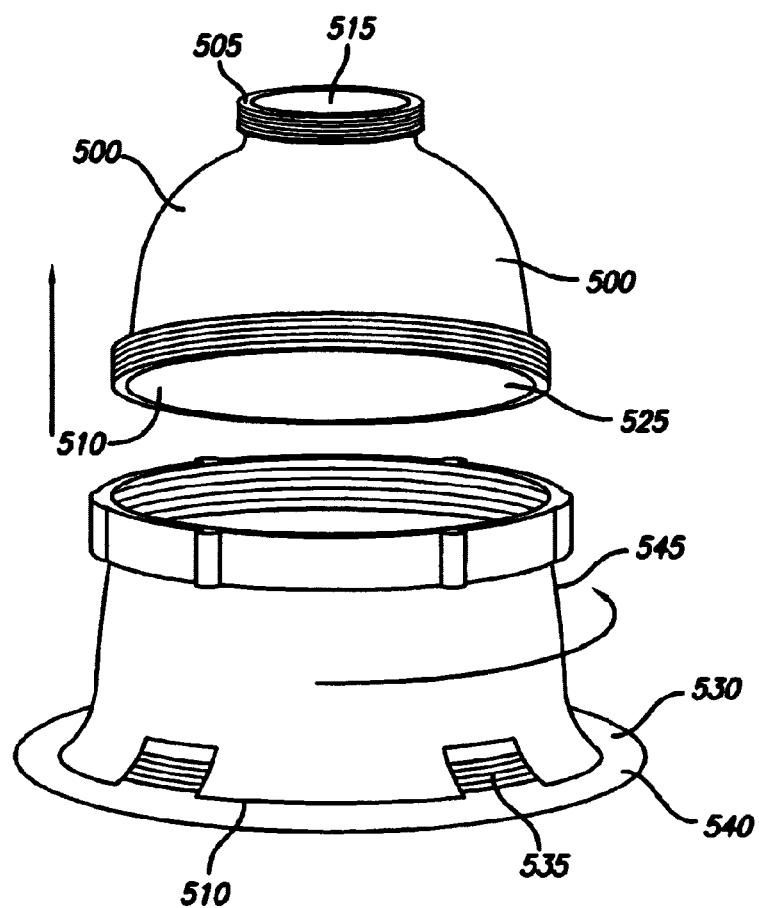
FIG. 5 and FIG. 6 are pictorial representations of steps of setting up another embodiment of the apparatus for flood relief according to the present invention.
Figure 6:
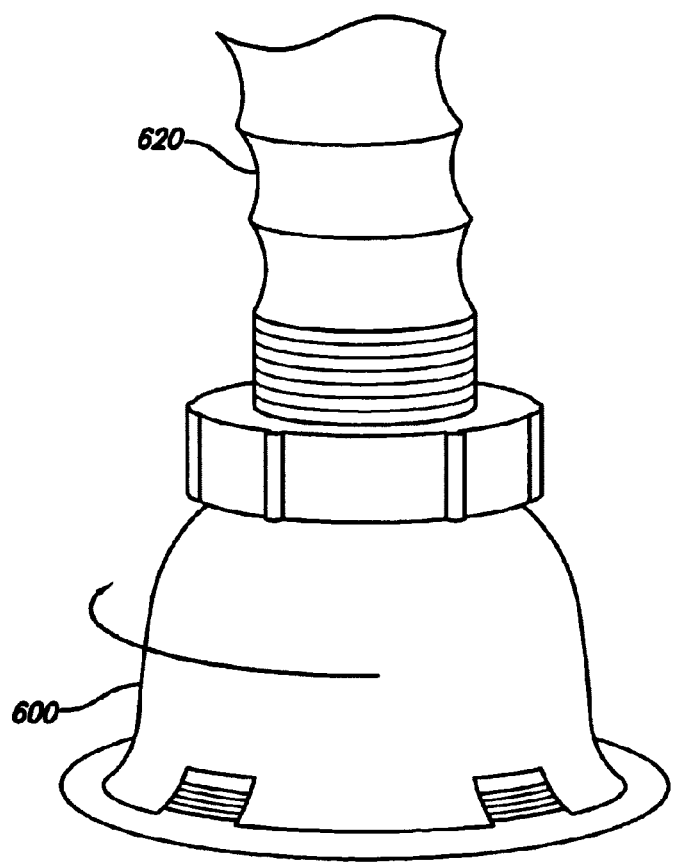

FIG. 5 and FIG. 6 are pictorial representations of steps of setting up another embodiment of the apparatus for flood relief according to the present invention. In this embodiment the apparatus for flood relief comprises a bell shaped hollow body 500 having a top 505, a bottom 510, a top opening 515 suitable for attaching a hose 520, and a bottom opening 525. It further has a base ring 530 having a center opening 535, a bottom surface 540, a side 545 whereby the base ring 530 is placed on the floor of a basement so that the center opening 535 of the base ring 530 is juxtaposed with a drain opening and the body 500 is screwed on the base ring 530 and the hose 520/620 is attached to the body 500/600 whereby water that rises through a basement trap will pass through the body 500/600 and the hose 520/620 and will be deposited onto a yard of a house.

What is claimed is:

1. An apparatus for flood relief comprising:
   a. a bell shaped hollow body having a top, a bottom, a top opening suitable for attaching a hose, and a bottom opening;
   b. a base ring having a center opening, a bottom surface, a side, an adhesive material on the bottom surface, and a protective sheet attached to the adhesive material; and c. a hose having the means for attaching said hose to the top opening of the body, whereby the protective sheet is removed from the adhesive material on the bottom surface of the base ring and the base ring is placed on the floor of a basement so that the center opening of the base ring is juxtaposed with a drain opening and the body is screwed on the base ring and the hose is attached to the body whereby water that rises through a basement trap will pass through the body and the hose and will be deposited onto a yard of a house.

2. An apparatus for flood relief as set forth in claim 1, whereby the body and the base ring have plurality of apertures on the side whereby a plurality of water doors are secured within said apertures whereby when the water rises through the base ring, water pressure will cause the water doors to shut preventing water to run onto a basement floor and when the water level drops the water doors will open allowing water that is on the basement floor to go down the drain.

* * * * *